United States Patent
Lee

(10) Patent No.: US 8,511,735 B2
(45) Date of Patent: Aug. 20, 2013

(54) PANORAMIC ROOF APPARATUS FOR VEHICLE

(75) Inventor: Ho Ryul Lee, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 149 days.

(21) Appl. No.: 13/181,955

(22) Filed: Jul. 13, 2011

(65) Prior Publication Data
US 2012/0139284 A1    Jun. 7, 2012

(30) Foreign Application Priority Data
Dec. 7, 2010  (KR) .................. 10-2010-0123908

(51) Int. Cl.
*B60J 3/02*    (2006.01)
(52) U.S. Cl.
USPC ..... 296/97.4; 296/97.8; 160/120; 160/370.22
(58) Field of Classification Search
USPC ............ 296/97.4, 97.8, 97.9, 97.11, 98, 99.1, 296/214, 223; 160/120, 265, 370.22
See application file for complete search history.

(56) References Cited

U.S. PATENT DOCUMENTS

| | | | | |
|---|---|---|---|---|
| 5,186,231 | A | * | 2/1993 | Lewis ........................... 160/310 |
| 7,665,793 | B2 | * | 2/2010 | Elbs et al. .................... 296/97.4 |
| 2002/0060470 | A1 | * | 5/2002 | Schlecht et al. ............. 296/97.4 |
| 2007/0256795 | A1 | * | 11/2007 | Christian et al. ............. 160/120 |
| 2008/0036245 | A1 | * | 2/2008 | Koelbl et al. ................. 296/214 |

FOREIGN PATENT DOCUMENTS

| | | | |
|---|---|---|---|
| DE | 1946161 B | * | 1/1978 |
| EP | 1588882 A1 | * | 10/2005 |
| JP | 2008-128287 A | | 6/2008 |
| JP | 2010-982 A | | 1/2010 |
| KR | 2003-0082892 A | | 10/2003 |
| KR | 10-2004-0084655 A | | 10/2004 |

OTHER PUBLICATIONS

Machine translation of DE 1,946,161 retreived on Feb. 7, 2013, translated via the EPO translation website found at http://translationportal.epo.org/emtp/translate/?ACTION=description-retrieval&COUNTRY=DE&ENGINE=google&FORMAT=docdb&KIND=A1&LOCALE=en_EP&NUMBER=1946161&OPS=ops.epo.org&SRCLANG=de&TRGLANG=en.*

* cited by examiner

*Primary Examiner* — Glenn Dayoan
*Assistant Examiner* — Jason S Daniels
(74) *Attorney, Agent, or Firm* — Morgan, Lewis & Bockius LLP

(57) ABSTRACT

A panoramic roof apparatus for a vehicle may include a front roll blind and a rear roll blind that may be slidably mounted to a rail, a worm wheel gear coupled to a motor, first cables connected to both sides of the front roll blind respectively and disposed in parallel each other across the worm wheel gear, and second cables connected to both sides of the rear roll blind respectively and disposed in parallel each other across the worm wheel gear, wherein the first and second cables may be spaced in a predetermined distance along an axial direction of the worm wheel gear, and wherein the worm wheel gear selectively moves along the axial direction thereof and may be selectively engaged with and actuates the first cables or the second cables so as to individually open and close the front roll blind or the rear roll blind.

2 Claims, 7 Drawing Sheets

PANORAMIC ROOF APPARATUS FOR VEHICLE

CROSS-REFERENCE TO RELATED APPLICATION

The present application claims priority to Korean Patent Application No. 10-2010-0123908 filed Dec. 7, 2010, the entire contents of which is incorporated herein for all purposes by this reference.

BACKGROUND OF THE INVENTION

1. Field of the Invention

The present invention relates to a panoramic roof apparatus for a vehicle. More particularly, it relates to an apparatus for opening and closing a panoramic roof mounted on the roof of a vehicle.

2. Description of Related Art

Generally, sunroofs have been mounted on the roof of vehicles to perform internal ventilation of the vehicle and provide an expansive view to a passenger.

Sunroofs may be manufactured through heat-treatment to endure intense sunlight. Sunroofs may be formed of glass materials that efficiently block ultraviolet rays and infrared rays, or may be formed of high-intensity materials so that passengers may not be injured by glass fragments in case of an accident.

Sunroofs are typically operated in a fully-open type and a partially open type in which only a rear portion of a sunroof is opened to ventilate a vehicle.

Recently, panoramic roofs that can provide a convertible-like comfort by manufacturing most of a roof panel, not only a front portion thereof, using glass and thus maximizing a view are becoming popular.

A panoramic roof has a structure in which most of a roof panel of a vehicle is opened, and is covered with glass. When glass is opened, most of roof is opened to provide an expansive view to a passenger.

Such a panoramic roof is categorized into a two-piece type and a three-piece type according to the number of pieces of glass, and the pieces of glass are operated in a tilting type or sliding type according to its mechanism structure.

A driving unit of an early panoramic roof is divided into a roll blind part and a glass part that require motors for their operation, respectively. Particularly, the roll blind is divided into front and rear roll blinds, and two motors are needed to operate them individually. Accordingly, there is a limitation in that a total of three motors have to be provided.

In order to overcome such a limitation, a panorama driving unit for simultaneously driving a front roll blind and a rear roll blind with only one motor has been proposed recently.

For example, as shown in FIGS. 1 and 2, a front roll blind 11 and a rear roll blind 12 are horizontally disposed between both rails 10. The front roll blind 11 and the rear roll blind 12 are connected to a worm wheel gear 15 of a motor 14 through cables 13a and 13b, respectively.

In this case, one cable 13a is connected between one side of the front roll blind 11 and one side of the rear roll blind 12, and the other cable 13b is connected between the other side of the front roll blind 11 and the other side of the rear roll blind 12.

This configuration may drive both the front roll blind and the rear roll blind with one motor. The cables can move in opposite directions upon rotation of the motor, thereby allowing the front roll blind and the rear roll blind to simultaneously move in the open or close direction.

However, the driving method of the panoramic roof according to a related art has a limitation in that the front roll blind and the rear roll blind are simultaneously operated.

For example, when a passenger sitting on a front seat opens the roll blind, the rear roll blind may also be simultaneously opened. In this case, a passenger sitting on a rear seat may feel uncomfortable with incident sunlight. Accordingly, the panoramic roof according to the related art is needed to be improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a panoramic roof apparatus for a vehicle, which can facilitate cost and material saving because front and rear roll blind parts and a glass part are simultaneously operated by a total of two motors and provide convenience to both passengers sitting on the front seat and passengers sitting on the rear seat through individual opening and closing of a front roll blind and a rear roll blind, through a new type of roll blind driving method that operates the front and rear roll blinds, respectively, using one motor that is selectively connected to cables for moving the front and rear roll blinds in order to individually move the front and rear roll blinds of a panoramic roof.

In an aspect of the present invention, the panoramic roof apparatus for a vehicle may include a front roll blind and a rear roll blind that may be slidably mounted to a rail, a worm wheel gear coupled to a motor, first cables that may be connected to both sides of the front roll blind respectively and may be disposed in parallel each other across the worm wheel gear, and second cables that may be connected to both sides of the rear roll blind respectively and may be disposed in parallel each other across the worm wheel gear, wherein the first and second cables may be spaced in a predetermined distance along an axial direction of the worm wheel gear, and wherein the worm wheel gear selectively moves along the axial direction thereof and may be selectively engaged with and actuates the first cables or the second cables so as to individually open and close the front roll blind or the rear roll blind.

The first cables and the second cables may be mounted and guided along a pair of cable guide grooves that may be formed in parallel at upper and lower portions of a cable casing.

The worm wheel gear may include a driving gear unit continuously engaged with a worm gear of the motor to move the worm wheel gear forward and backward around the axial direction thereof, and a power-transfer gear unit extending from the driving gear unit and being selectively engaged with the first cables or the second cables in accordance with a movement of the driving gear unit along the axial direction of the worm wheel gear, wherein an actuator selectively drives the power-transfer gear unit of the worm wheel gear along the axial direction of the worm wheel gear to change a contact location of the driving gear unit with the first and second cables, and wherein a return spring elastically biases the worm wheel gear in a direction to allow the worm wheel gear to be engaged with the first cables or the second cables according to a driving force of the actuator or a resilient force of the return spring.

The first cables and the second cables may be mounted and guided along a pair of cable guide grooves that may be formed in parallel at upper and lower portions of a cable casing.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
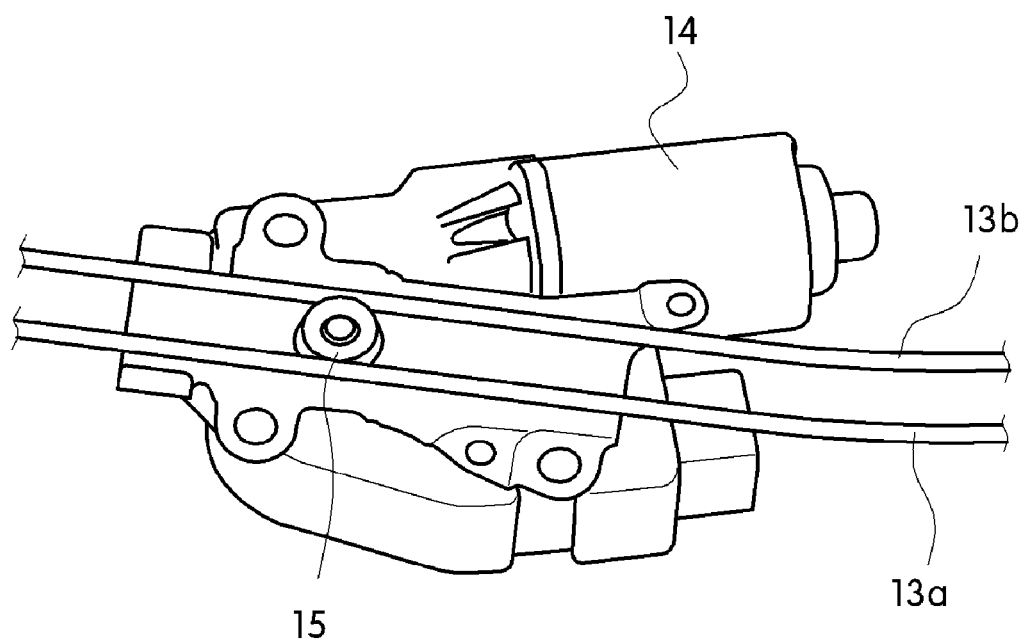
FIG. 1 is a perspective view illustrating a driving unit of a panoramic roof apparatus for a vehicle according to a related art.
Figure 2:
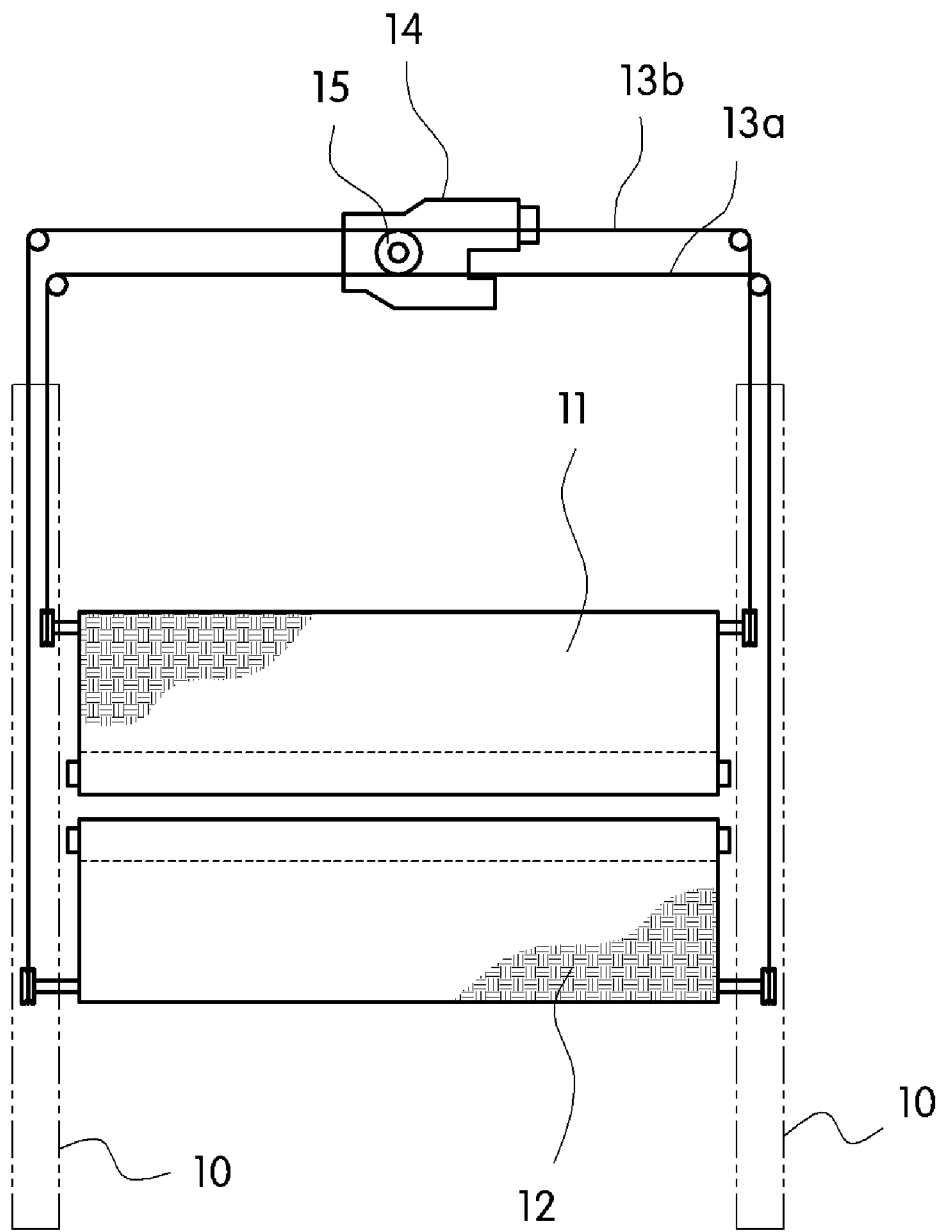
FIG. 2 is a schematic view illustrating an operating method of a panoramic roof apparatus for a vehicle according to a related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiment of the present invention will be described in detail with reference to the accompanying drawings.

Figure 3:
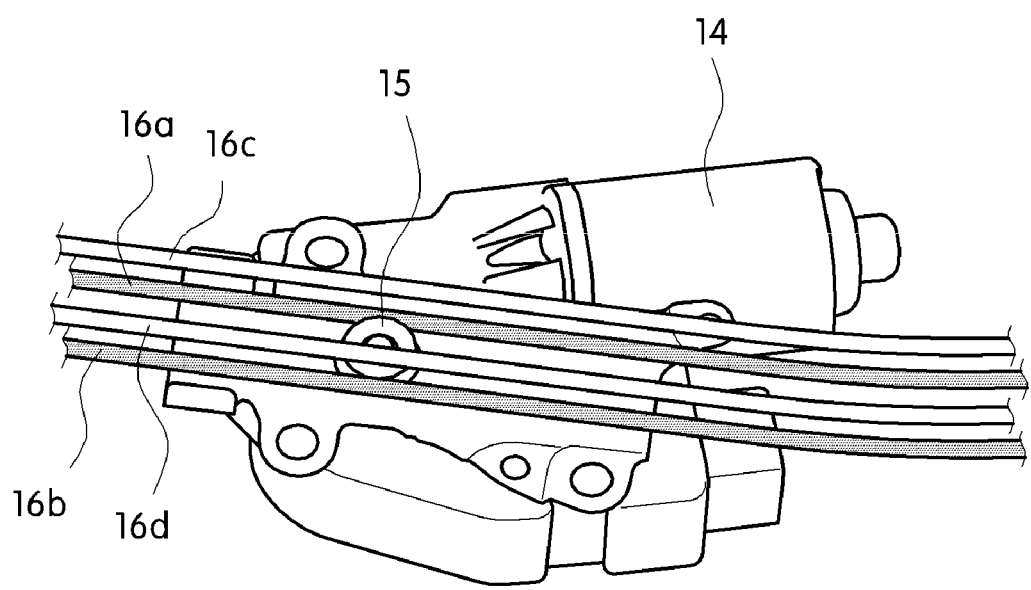
FIG. 3 is a perspective view illustrating a driving unit of a panoramic roof apparatus for a vehicle according to an exemplary embodiment of the present invention.

FIG. 3 is a perspective view illustrating a driving unit of a panoramic roof apparatus for a vehicle according to an exemplary embodiment of the present invention.

As shown in FIG. 3, a motor 14 may be provided as a driving source for individually operating front and rear roll blinds, and a worm wheel gear 15 that is rotated by the motor 14 may be provided. Two pairs of cables that are parallel to each other may be horizontally disposed at a certain interval over the worm wheel gear 15.

That is, the two pairs of cables, which are cables for moving the front roll blind and the rear roll blind, respectively, may include first cables 16a and 16b that are disposed on the worm wheel gear 15 and are connected to the both ends of the front roll blind, and second cables 16c and 16d that are parallelly disposed spaced from the first cables 16a and 16b by a certain distance and are connected to the both ends of the rear roll blind.

Accordingly, when the motor 14 operates, the worm wheel gear 15 may be rotated by a worm gear connected to a motor shaft. In this case, since the first cables 16a and 16b or the second cables 16c and 16d are selectively driven through power transfer by contact with the worm gear 15 that are rotating, the front roll blind and the rear roll blind may individually move.

Figure 4A:
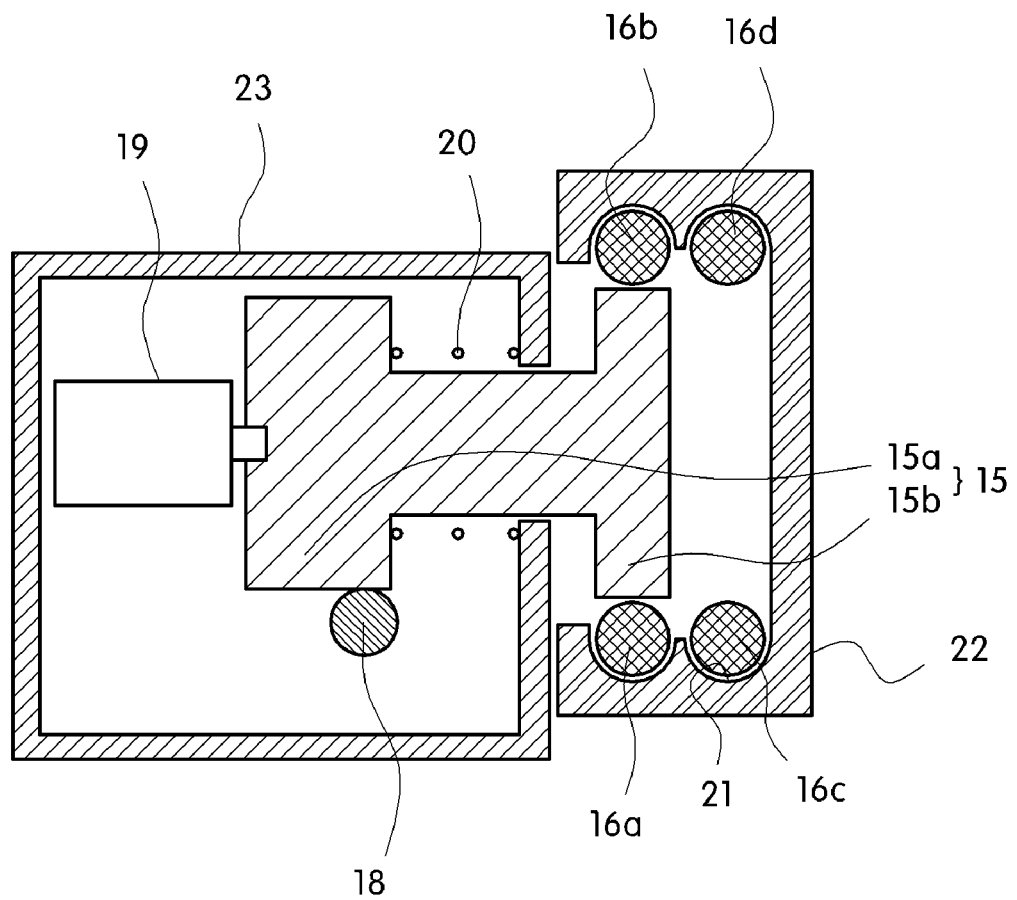
FIGS. 4A and 4B are cross-sectional views illustrating an operation state of a driving unit in a panoramic roof apparatus for a vehicle according to an exemplary embodiment of the present invention.
Figure 4B:
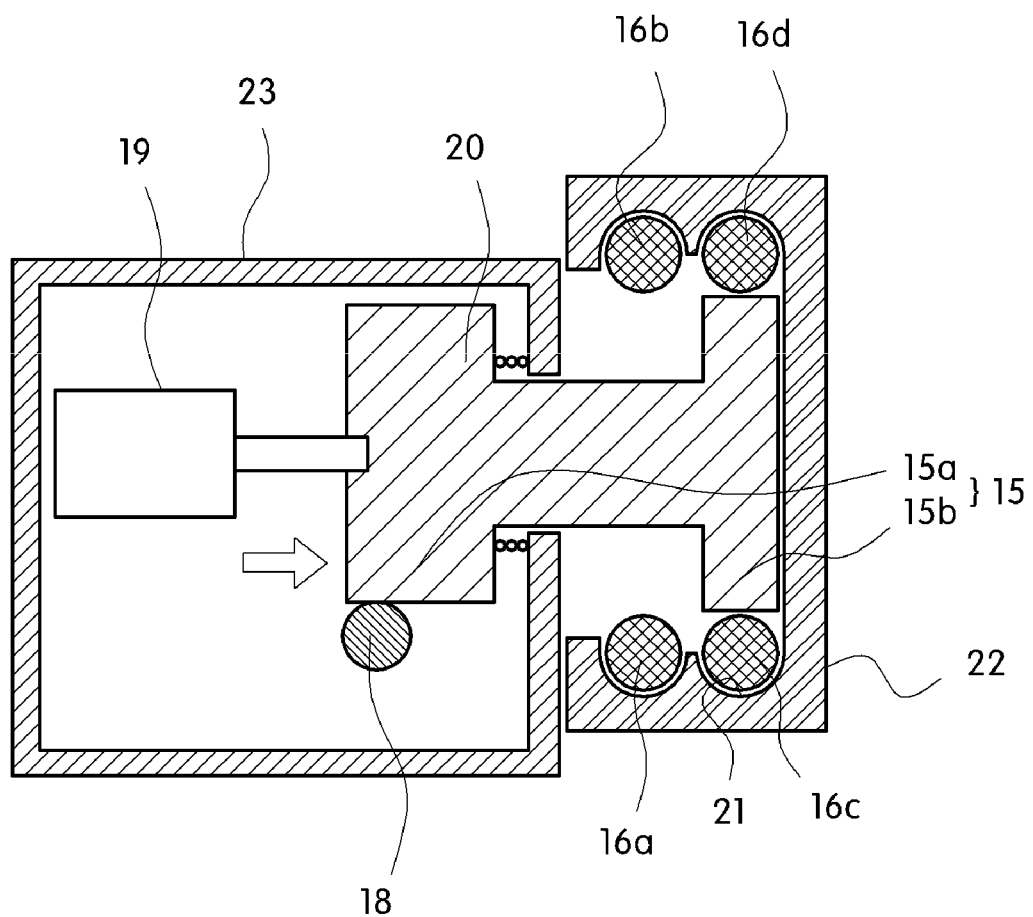

FIGS. 4A and 4B are cross-sectional views illustrating the operation state of a driving unit in a panoramic roof apparatus for a vehicle according to an exemplary embodiment of the present invention.

As shown in FIGS. 4A and 4B, there is shown a structure in which the worm wheel gear 15 selectively moves the front roll blind cable, i.e., the first cables 16a and 16b, and the rear roll blind cable, i.e., the second cables 16c and 16d.

To this end, the worm wheel gear 15 may include a driving gear unit 15a engaging with a worm gear 18 at the side of the motor 14, and a power-transfer gear unit 15b selectively engaging with the first cables 16a and 16b or the second cables 16c and 16d. The worm wheel gear 15 as configured above may vary in its location back and forth.

In this case, since the driving gear unit 15a of the worm wheel gear 15 has gear teeth of great width, the driving gear unit 15a may always maintain engagement state with the worm gear 18 at the side of the motor 14 even when the worm wheel gear 15 moves back and forth.

A solenoid 19 and a return spring 20 may be provided to move the worm wheel gear 15 back and forth.

The solenoid 19 may be mounted in a motor housing 23, and may couple its rod to one end of the worm wheel gear 15, i.e., one end of the driving gear unit 15a. The return spring 20 may be located at a location opposite to the solenoid 19 in the motor housing 23, and may resiliently support the other end of the driving gear unit 15a of the worm wheel gear 15.

Accordingly, when power is applied to the solenoid 19, the worm wheel gear 15 may move forward to engage with and drive the rear roll blind cables 16c and 16d. On the other hand, when power is cut off, the worm wheel gear 15 may move backward to engage with and drive the front roll blind cables 16a and 16b.

In this case, the solenoid 19 may be powered on or off by a separate switching operation.

Also, a cable housing 22 may be provided to exactly guide the first cables 16a and 16b and the second cables 16c and 16d along a straight path. In this case, two pairs of cable guide grooves 21 may be vertically formed in the cable housing 22, so that the first cable 16a and the second cable 16c, and the first cable 16b and the second cable 16d that are parallelly disposed at the lower and upper portions of the cable housing 22, respectively, may be guided along the cable guide grooves 21.

Figure 5:
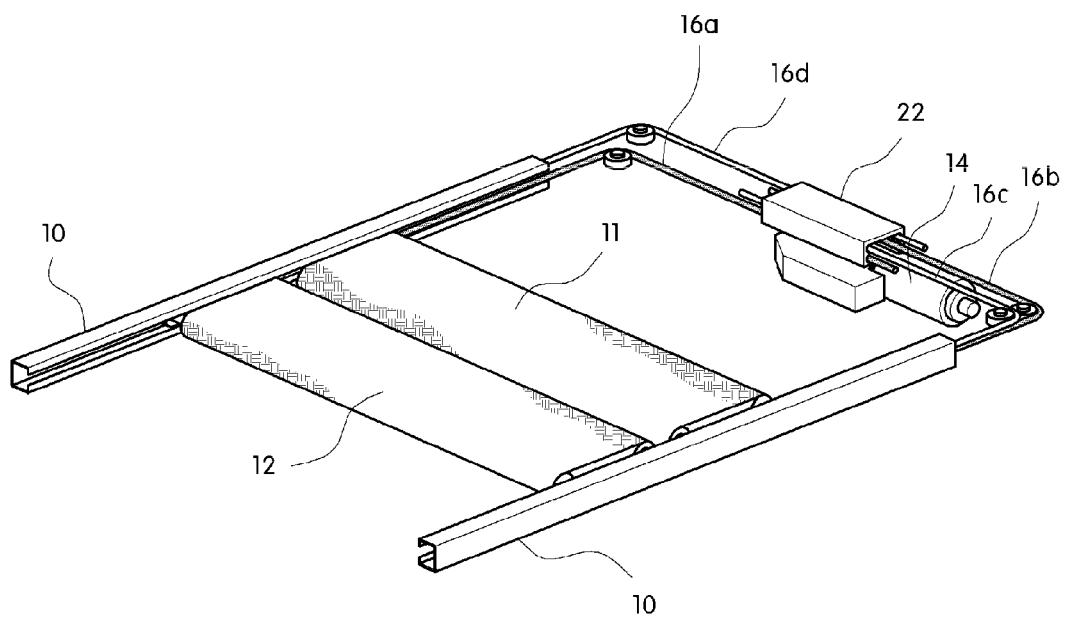
FIG. 5 is a perspective view illustrating an operating method of a panoramic roof apparatus for a vehicle according to an exemplary embodiment of the present invention.

FIG. 5 is a perspective view illustrating an operating method of a panoramic roof apparatus for a vehicle according to an exemplary embodiment of the present invention.

As shown in FIG. 5, a connection relation between the first cables 16a and 16b and the second cables 16c and 16d, and the front and rear roll blinds are shown.

The front roll blind 11 and the rear roll blind 12 may be horizontally disposed between both sides of the rail 10, and may be moved by the cables. Also, the motor 14 and the worm wheel gear 15 may be provided between the both sides of the rail 10. The cables may include the first cables 16a and 16b and the second cables 16c and 16d.

Here, the first cables 16a and 16b may be connected to one side of the front roll blind 11 and the other side (opposite side) of the front roll blind 11, and may be disposed parallel to each other across the worm wheel gear 15.

The second cables 16c and 16d may be connected to one side of the rear roll blind 12 and the other side (opposite side) of the rear roll blind 12, and may be disposed parallel to each other across the worm wheel gear 15.

The first cables 16a and 16b and the second cables 16c and 16d may be horizontally disposed spaced from each other by a certain distance.

Thus, since the worm wheel gear 15 that can move forward and backward selectively contacts and moves the first cables 16a and 16b or the second cables 16c and 16d, the front roll blind and the rear roll blind may be individually opened and closed.

Hereinafter, the operating state of a panoramic roof apparatus for a vehicle will be described.

Figure 6A:
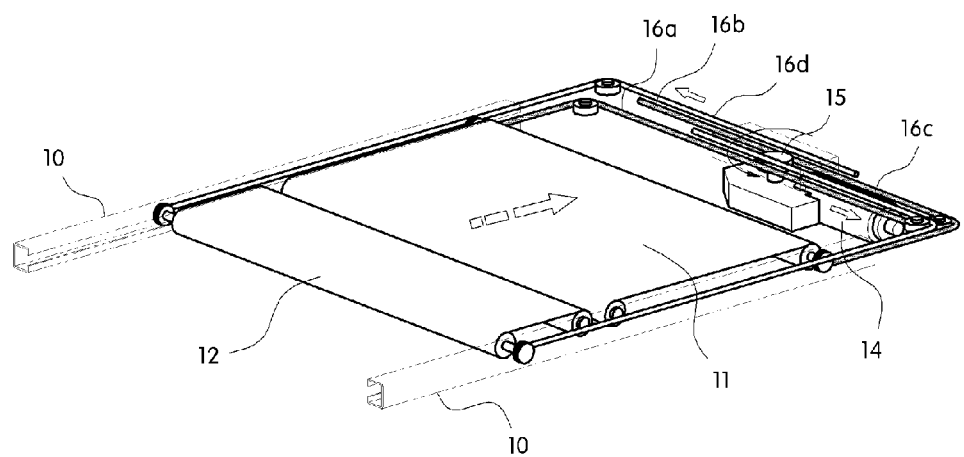
FIGS. 6A and 6B are perspective views illustrating an open or close state of a panoramic roof in a panoramic roof apparatus for a vehicle according to an exemplary embodiment of the present invention.
Figure 6B:
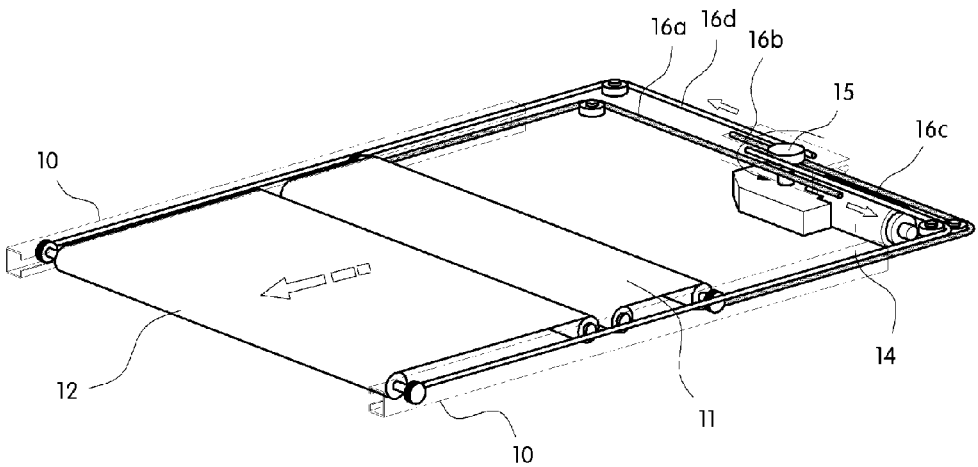

FIGS. 6A and 6B are perspective views illustrating an open or close state of a panoramic roof in a panoramic roof apparatus for a vehicle according to an exemplary embodiment of the present invention.

As shown in FIG. 6A, a close state of the front roll blind is shown.

When the solenoid is powered off, the worm wheel gear 15 may move in a counterclockwise direction by the motor 14 while engaging with the first cables 16a and 16b at a backward position thereof. In this case, the first cables 16a and 16b contacting the upper and lower sides of the worm wheel gear 15 may be drawn in the arrow direction, and thus the front roll blind 11 may move in the arrow direction of the drawing to allow the front roll blind to become the close state.

As shown in FIG. 6B, a close state of the rear roll blind is shown.

When the solenoid is powered on, the worm wheel gear 15 may move in a counterclockwise direction by the motor 14 while engaging with the second cables 16c and 16d at a forward position thereof. In this case, the second cables 16c and 16d contacting the upper and lower sides of the worm wheel gear 15 may be released in the arrow direction, and thus the front roll blind 11 may move in the arrow direction of the drawing to allow the rear roll blind to become the close state.

In the panoramic roof apparatus of the present invention, since the front roll blind and the rear roll blind can be individually opened and closes, it is possible to make any or both of the front roll blind and the rear roll blind become open or close state.

A panoramic roof apparatus for a vehicle according to an exemplary embodiment of the present invention has the following advantages.

First, since one motor individually operates front and rear roll blinds while being selectively connected to front and rear roll blind cables, front and rear roll blinds parts and a glass part can be simultaneously operated with a total of two motors, thereby achieving cost and material saving.

Second, since the front and rear roll blinds can be individually opened and closed, it is possible to provide convenience to both passengers sitting on the front seat and passengers sitting on the rear seat, and thus achieve the quality of luxury vehicles.

For convenience in explanation and accurate definition in the appended claims, the terms "upper", "lower", "inner", "outer", "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A panoramic roof apparatus for a vehicle comprising:
 a front roll blind and a rear roll blind that are slidably mounted to a rail;
 a worm wheel gear coupled to a motor;
 first cables that are connected to both lateral sides of the front roll blind respectively and are disposed in parallel each other across the worm wheel gear; and
 second cables that are connected to both lateral sides of the rear roll blind respectively and are disposed in parallel each other across the worm wheel gear;
 wherein the first and second cables are spaced in a predetermined distance along an axial direction of the worm wheel gear;
 wherein the worm wheel gear selectively moves along the axial direction thereof and is selectively engaged with and actuates the first cables or the second cables so as to individually open and close the front roll blind or the rear roll blind;
 wherein the worm wheel gear comprises:
  a driving gear unit continuously engaged with a worm gear of the motor to move the worm wheel gear forward and backward around the axial direction thereof; and
  a power-transfer gear unit extending from the driving gear unit and being selectively engaged with the first cables or the second cables in accordance with a movement of the driving gear unit along the axial direction of the worm wheel gear;
 wherein an actuator selectively drives the driving gear unit along the axial direction of the worm wheel gear to change a contact location of the power-transfer gear unit with the first and second cables; and
 wherein a return spring elastically biases the worm wheel gear in a direction to allow the worm wheel gear to be engaged with the first cables or the second cables according to a driving force of the actuator or a resilient force of the return spring.

2. The panoramic roof apparatus of claim 1, wherein the first cables and the second cables are mounted and guided along a pair of cable guide grooves that are formed in parallel at upper and lower portions of a cable casing.

* * * * *